United States Patent [19]

Lech, Jr.

[11] 4,375,254
[45] Mar. 1, 1983

[54] CLUTCH DRIVEN PLATE ASSEMBLY WITH CUSHIONED FRICTION MATERIAL

[75] Inventor: Thaddeus Lech, Jr., Sterling Heights, Mich.

[73] Assignee: Borg-Warner Corporation, Chicago, Ill.

[21] Appl. No.: 207,833

[22] Filed: Nov. 17, 1980

[51] Int. Cl.³ .............................. F16D 13/69
[52] U.S. Cl. ................................ 192/107 C
[58] Field of Search ................... 192/107 C, 107 R

[56] References Cited

U.S. PATENT DOCUMENTS

| 2,448,880 | 9/1948 | Gamble | 192/107 C |
| 2,587,837 | 3/1952 | Goodwin | 192/107 C |
| 2,876,879 | 3/1959 | Maurice et al. | 192/84 |
| 2,985,273 | 5/1961 | Binder | 192/68 |
| 3,261,439 | 7/1966 | Binder | 192/107 |
| 3,280,949 | 10/1966 | Ross | 192/107 |
| 3,520,389 | 7/1970 | Smales | 192/107 |
| 3,526,307 | 9/1970 | Falzone | 192/107 |
| 3,696,902 | 10/1972 | Dantele | 192/107 |
| 3,897,859 | 8/1975 | Norcia | 192/107 |

FOREIGN PATENT DOCUMENTS

| 2424446 | 4/1978 | France . | |
| 1404354 | 8/1975 | United Kingdom | 192/107 C |

Primary Examiner—Rodney H. Bonck
Attorney, Agent, or Firm—James A. Geppert

[57] ABSTRACT

A clutch driven plate assembly for an automotive vehicle wherein the clutch plate has radially extending lobes carrying friction pads of a suitable material, with the pads being mounted on cushioning means so as to present a yieldable friction surface to the engaging surfaces of the clutch assembly.

7 Claims, 8 Drawing Figures

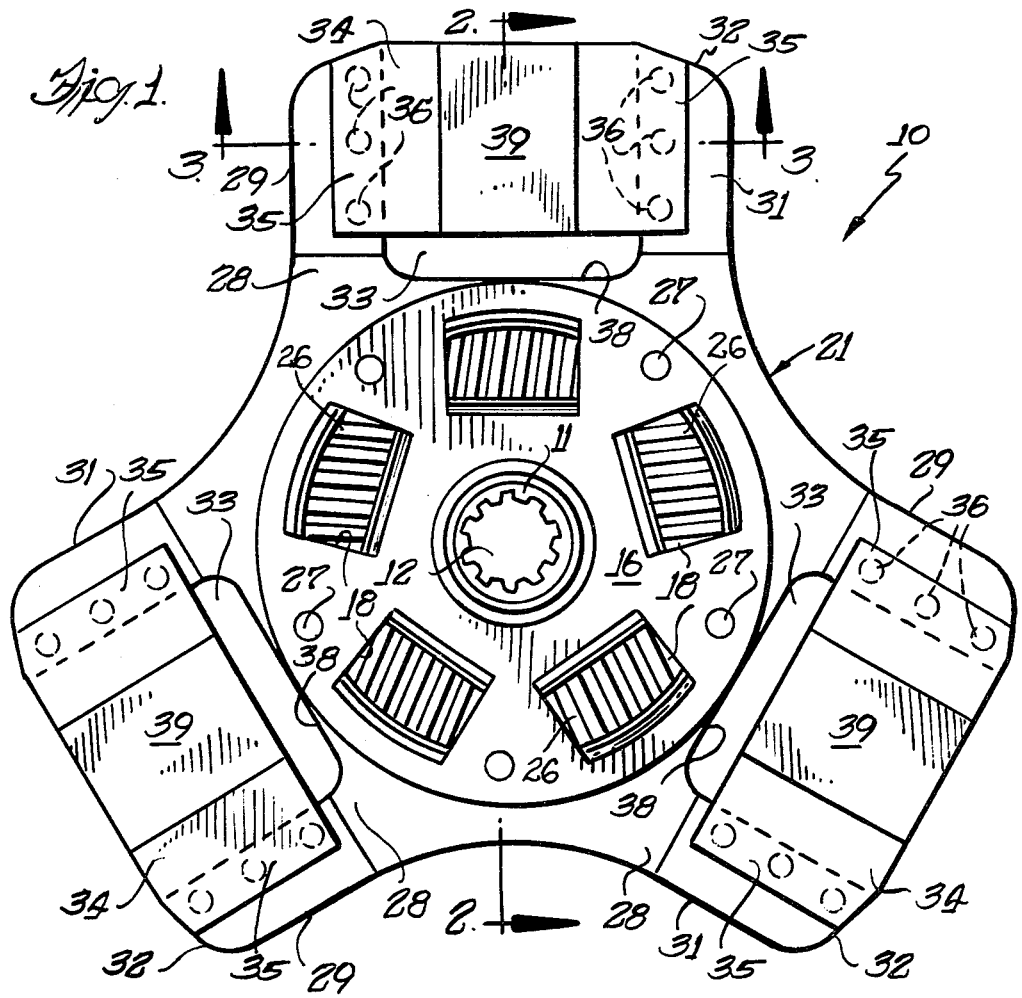
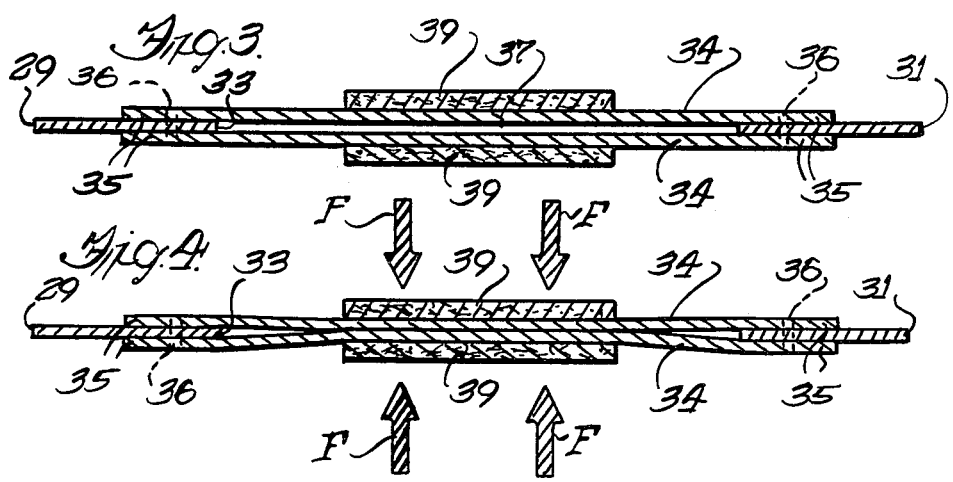

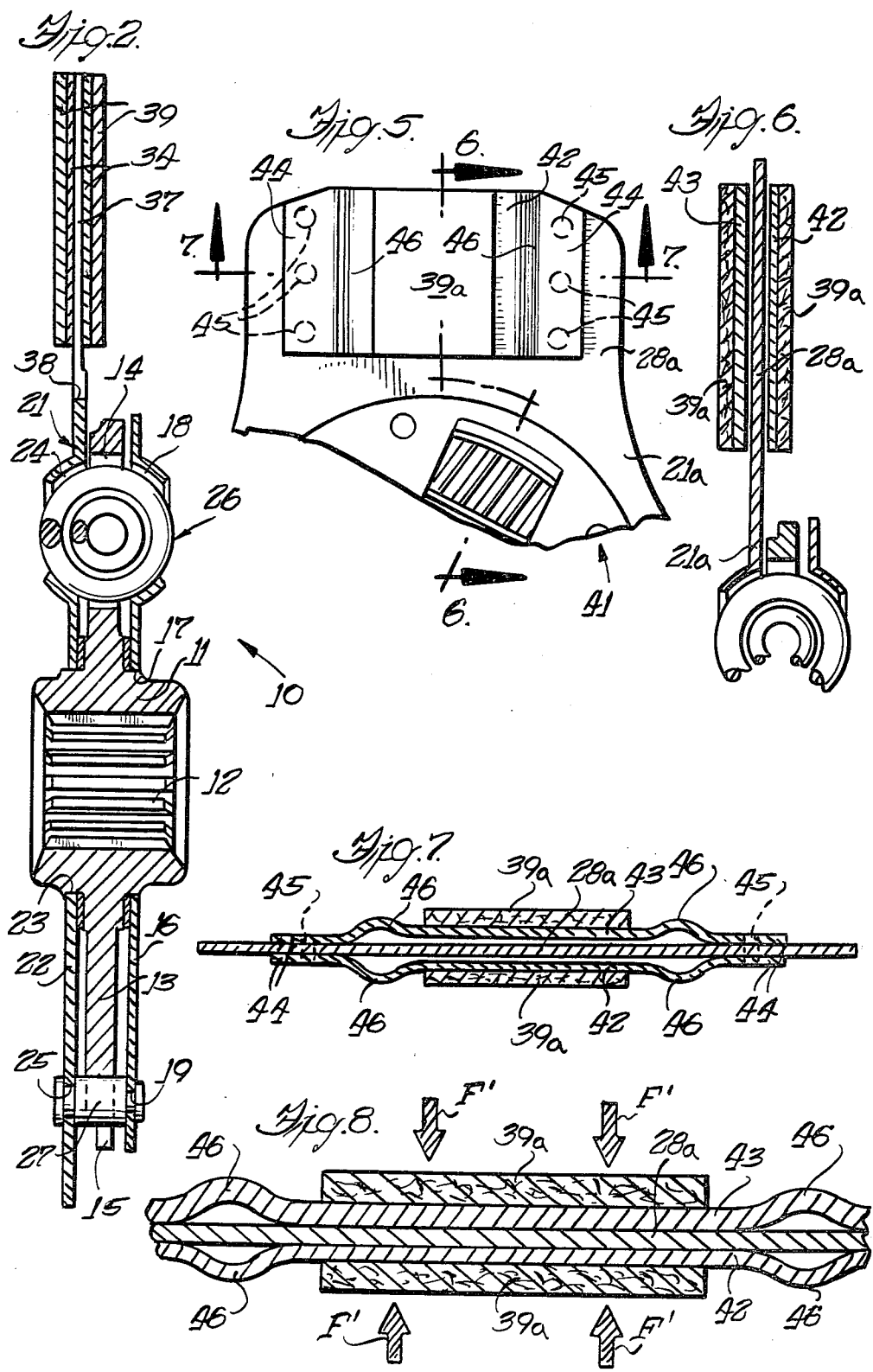

CLUTCH DRIVEN PLATE ASSEMBLY WITH CUSHIONED FRICTION MATERIAL

BACKGROUND OF THE INVENTION

Conventional friction clutch assemblies for automotive and other vehicles generally consist of a hub and integral flat clutch driven plate carrying suitable friction surfaces in the form of annular flat friction rings riveted or otherwise secured to the clutch plate. The plate and hub are positioned on a transmission input shaft between a flywheel and reciprocable pressure plate driven by the vehicle motor. When the vehicle operator depresses the clutch pedal, the pressure plate is axially moved away from the flywheel to disengage the clutch and, upon release of the pedal, the pressure plate moves toward the clutch plate which is engaged between the pressure plate and flywheel.

When the clutch is being engaged, the entire contact area of the opposite clutch surfaces substantially simultaneously engages the flywheel and pressure plate, and the clutch may chatter due to the aggressive, grabby nature of the friction material; especially if a metallic friction material is utilized. Chatter is generated when the capacity of an engagement point of the clutch matches the torque demand. At this time the relative motion between the clutching parts is zero, and the friction material assumes its higher static coefficient of friction to stop and hold on the engaging surfaces until the torque demand exceeds this capacity to cause the friction pads to break loose again into a dynamic condition. This jerky stopping and starting of the friction material is chatter. The present invention provides a clutch plate structure obviating the aggressive nature of the friction material.

SUMMARY OF THE INVENTION

The present invention relates to a novel clutch plate assembly wherein the clutch plate includes radially extending lobes carrying pads of friction material which are attached to cushioning means that resists the clutch engaging force to enhance clutch engagement. The cushioning means generates a force to hold the friction pads against their engaging surfaces and to resist the engaging force. This causes a smoother application of the engaging force over a longer travel.

The present invention also relates to a novel clutch plate assembly having friction pads with cushioning means to provide an elastic connection between the friction pads contacting opposite surfaces to act as a shock absorber to balance and cushion their interaction with their engaging surfaces.

The present invention further comprehends a novel clutch plate assembly with friction pads on radial lobes of the clutch plate and cushioning means for the friction pads which has a force that will be overcome by the engaging force after clutch engagement has occurred.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view of a clutch plate embodying the present invention.

FIG. 2 is a vertical cross sectional view taken on the line 2—2 of FIG. 1.

FIG. 3 is a horizontal cross sectional view taken on the line 3—3 of FIG. 1.

FIG. 4 is a cross sectional view similar to FIG. 3, but showing the friction pads in their engaged position.

FIG. 5 is a partial rear elevational view of a second embodiment of the clutch plate.

FIG. 6 is a generally vertical cross sectional view taken on the irregular line 6—6 of FIG. 5.

FIG. 7 is a horizontal cross sectional view taken on the line 7—7 of FIG. 5.

FIG. 8 is an enlarged cross sectional view similar to FIG. 7, but showing the friction pads in their engaged position.

DESCRIPTION OF THE PREFERRED EMBODIMENTS

Referring more particularly to the disclosure in the drawings wherein are shown illustrative embodiments of the present invention, FIGS. 1 through 4 disclose a clutch plate assembly 10 for use in an automotive vehicle clutch assembly between a motor driven flywheel and an axially reciprocable pressure plate rotated simultaneously with the flywheel and urged into engagement by a diaphragm spring (not shown). This clutch plate assembly is similar to conventional automotive clutch driven plate assemblies including a hub 11 with a central splined opening 12 adapted to receive the splined end of a transmission input shaft (not shown) and a radial flange 13 having circumferentially spaced windows 14 and peripheral notches 15 therein. A spring retainer plate 16 has a central opening 17 receiving the hub 11, circumferentially spaced windows 18 and openings 19 formed therein.

A clutch driven plate 21 has a generally circular central body portion 22 with a central opening 23 receiving the hub 11, circumferentially spaced windows 24 and openings 25. The windows 14, 18 and 24 in the hub flange 13, spring retainer plate 16 and clutch plate 21, respectively, are axially aligned to receive compression springs 26 for torsional damping of the clutch. Spacer rivets 27 are received in the axially aligned openings 19 and 25 in the plates to secure them together and pass through the peripheral notches 15 in the hub flange to provide a limit on the relative rotary movement between the plates and the hub.

The clutch plate is provided beyond the stop pins 27 with three radially extending lobes 28 which are circumferentially equally spaced about the plate. Each lobe 28 has generally parallel sides 29, 31 terminating in a curved outer edge 32, with a centrally located radially extending notch 33 opening into the edge 32 to form parallel lobe arms. A pair of elongated support plates 34, 34 are positioned on opposite surfaces of the lobe 28 extending across the notch 33 and secured to the lobe arms at their ends 35 by spot welds 36 along the lobe edges 29 and 31. The notch or slot 33 creates a space 37 between the plates 34, 34; with the notch extending radially inwardly of the plates to terminate at an inner edge 38 to allow air flow between the plates during operation of the clutch.

A pad 39 of a suitable friction material, such as a metallic friction material, is secured to each support plate 34, as by a suitable adhesive. The cushioning means resides in the natural springiness of the material forming the support plates 34, such as a resilient metallic material, and the operational stress is designed to be well below the yield point of the material so that its resilient properties will not be lost during operation at elevated temperatures, such as would occur in a vehicle clutch.

This assembly operates in a conventional manner in the clutch assembly except for the cushioning effect produced by deflection of the support or backing plates 34 during clutch engagement. As the clutch is engaged by the vehicle operator, the pressure plate squeezes the friction pads 39, 39 against the flywheel; the engaging force indicated by arrows F in FIG. 4 being resisted by the backing plates 34 as they deflect together. As the spring force is generated, the travel required to engage the clutch is increased which results in a better feathering in feel to the engagement. The spring force also balances the pads 39 against each other to cushion their actions with their engaging surfaces and is overcome by the engaging force after clutch engagement has occurred. When the clutch is engaged, the backing plates 34 will be squeezed together to contact each other in the area 37 between the pads 39 (see FIG. 4). When the clutch is disengaged, the plates 34 will move apart and allow cooling air to pass between them.

FIGS. 5 through 8 disclose a second embodiment of clutch plate assembly 41 wherein like parts will have the same reference numeral with a script a. This assembly includes a clutch plate 21a with three radial lobes 28a, each lobe carrying a pair of support or backing plates 42 and 43 secured at their ends 44 to the lobe by spot welds 45. The lobes 28a are of a constant thickness without openings or slots therein, and a friction pad 39a is securely bonded, as by a suitable adhesive, to each plate 42 or 43. The plates 42 and 43 are of different thickness; with the plates 42 and 43 spaced from the lobe 28a by parallel elongated ridges 46, 46 adjacent the opposite ends 44 thereof. The plates 42, 43 and the elongated ridges 46 therein provide the cushioning means for the friction pads.

This assembly operates in a conventional manner except for the cushioning means wherein, as the clutch is engaged, the friction pads 39a contact the engaging surfaces and, as the clutch is further engaged due to the force indicated by the arrows F' in FIG. 8, the plates 42, 43 deflect inwardly due to the ridges 46 until they stop out on the lobe 28a between them. As the plates 42 and 43 are of different thicknesses, the spring forces differ and the plates deflect as different rates. Again, the plates 42, 43 are made of a resilient metal and uses its natural springiness to generate the cushioning force when the pads are squeezed together to deflect the plates.

I claim:

1. A clutch driven plate comprising a generally circular plate having a plurality of circumferentially equally spaced radially extending lobes on the periphery thereof, a pair of oppositely disposed generally rectangular support plates extending transversely across each lobe with the opposite ends secured to said lobe on the opposite surfaces thereof, each support plate having a friction pad secured thereto, and cushioning means between said friction pads comprising a spacing between the support plates and the lobe so that the resiliency of the support plates provides a spring force resisting the clutch engaging force resulting in an elastic progression interacting with the engagement force.

2. A clutch plate as set forth in claim 1, in which said lobe has a radially extending slot forming parallel lobe arms, said support plates having their opposite ends secured to said spaced lobe arms.

3. A clutch plate as set forth in claim 2, in which the slot provides a space between said support plates to allow inward deflection thereby.

4. A clutch plate as set forth in claim 3, in which the cushioning means is provided by the natural springiness of said support plates having the spacing therebetween, said plates deflecting upon clutch engagement until they engage each other.

5. A clutch driven plate comprising a generally circular plate having a plurality of circumferentially equally spaced radially extending solid lobes on the periphery thereof, a pair of oppositely disposed generally rectangular support plates extending transversely across each lobe with the opposite ends secured to said lobe on the opposite surfaces thereof, each support plate having a friction pad secured thereto, and cushioning means between said friction pads to provide for an elastic progression interacting with the clutch engagement force and comprising a pair of parallel elongated ridges on each support plate adjacent the plate ends spacing the central portion of the support plate from the lobe so that the resiliency of the support plates provides a spring force resisting the engaging force.

6. A clutch plate as set forth in claim 5, in which the support plates on the opposite surfaces of a lobe are of a different thickness to provide differing deflection rates for the opposite plates.

7. A clutch plate as set forth in claim 5, in which the natural springiness of said support plates coacting with said ridges provides the cushioning action of the friction pads.

* * * * *